(12) United States Patent  
Lievre

(10) Patent No.: US 7,950,386 B2
(45) Date of Patent: May 31, 2011

(54) CARRIER FOR A SOLAR ENERGY REFLECTOR ELEMENT

(75) Inventor: Peter Le Lievre, North Sydney (AU)

(73) Assignee: Areva Solar Pty Limited, Singleton, NSW (AU)

( * ) Notice: Subject to any disclaimer, the term of this patent is extended or adjusted under 35 U.S.C. 154(b) by 946 days.

(21) Appl. No.: 10/563,171

(22) PCT Filed: Jul. 1, 2004

(86) PCT No.: PCT/AU2004/000884
§ 371 (c)(1),
(2), (4) Date: Dec. 29, 2005

(87) PCT Pub. No.: WO2005/003647
PCT Pub. Date: Jan. 13, 2005

(65) Prior Publication Data
US 2006/0157050 A1    Jul. 20, 2006

(30) Foreign Application Priority Data
Jul. 1, 2003    (AU) .................................. 2003903341

(51) Int. Cl.
*F24J 2/10* (2006.01)
(52) U.S. Cl. ......... 126/600; 126/605; 126/684; 126/689
(58) Field of Classification Search .................. 126/600, 126/605, 684, 689, 680, 696, 692, 693
See application file for complete search history.

(56) References Cited

U.S. PATENT DOCUMENTS

| 787,145 A | 4/1905 | Brown |
| 1,240,890 A | 9/1917 | Shuman et al. |
| 4,022,184 A | 5/1977 | Anderson |
| 4,106,485 A | 8/1978 | Polley |
| 4,108,154 A | 8/1978 | Nelson |
| 4,111,184 A | 9/1978 | Fletcher et al. |
| 4,136,671 A | 1/1979 | Whiteford |
| 4,159,710 A | 7/1979 | Prast |
| 4,203,426 A | 5/1980 | Matlock |

(Continued)

FOREIGN PATENT DOCUMENTS

WO    WO-2004/066401 A2    8/2004

(Continued)

OTHER PUBLICATIONS

International Search Report PCT/AU2004/000884.

(Continued)

*Primary Examiner* — Alfred Basichas
(74) *Attorney, Agent, or Firm* — K&L Gates LLP

(57) ABSTRACT

A reflector element carrier structure is disclosed for use in a solar energy reflector system. The structure comprises a reflector element (11), a corrugated platform (12) which carries the reflector element and a skeletal frame structure (13) which supports the platform. The frame structure comprises hoop-like end members (14) that are supported by rollers (18) and the rollers accommodate turning of the carrier structure about an axis of rotation that lies substantially coincident with a longitudinal axis of the reflector element (11). The combination of the corrugated platform (12), the frame structure (13) and the hoop-like end members (14) of the frame structure provide the carrier structure with a torsional stability that permits the application of turning drive from one end of the structure.

21 Claims, 3 Drawing Sheets

U.S. PATENT DOCUMENTS

| | | | |
|---|---|---|---|
| 4,291,677 | A | 9/1981 | Monk |
| 4,304,221 | A | 12/1981 | Trihey |
| 4,385,430 | A | 5/1983 | Bartels |
| 4,435,043 | A | 3/1984 | Mertens et al. |
| 4,436,373 | A | 3/1984 | Kirsch |
| 4,454,371 | A | 6/1984 | Folino |
| 4,515,148 | A * | 5/1985 | Boy-Marcotte et al. ...... 126/570 |
| 4,559,926 | A | 12/1985 | Butler |
| 4,730,602 | A | 3/1988 | Posnansky et al. |
| 4,820,033 | A | 4/1989 | Sick |
| 6,543,441 | B2 | 4/2003 | Funger |
| 6,994,082 | B2 | 2/2006 | Hochberg et al. |
| 2006/0150967 | A1 | 7/2006 | Hoelle et al. |

FOREIGN PATENT DOCUMENTS

| | | |
|---|---|---|
| WO | WO-2004/066401 A3 | 8/2004 |

OTHER PUBLICATIONS

Di Canio, D.G., et al., "Line Focus Solar Thermal Central Receiver Research Study: Final Report, Apr. 30, 1977-Mar. 31, 1979", Apr. 1979, 316 pages, DOEET204261, FMC Corp.

Francia, G. (1968). "Pilot Plants of Solar Steam Generating Stations," *Solar Energy* 12:51-64.

Häberle, A. et al. (Sep. 2002). "The Solarmundo Line Focussing Fresnel Collector. Optical and Thermal Performance and Cost Calculations," located at: <http://www.ise.fraunhofer.de/veroeffentlichungen/nach-jahrgaengen/2002/the-solarmundo-line-focussing-fresnel-collector-optical-and-thermal-performance-and-cost-calculations>, last visited Jul. 27, 2009, eleven pages.

Hu, E.J. et al. (2003). "Solar Power Boosting of Fossil Fuelled Power Plants," *Proceedings ISES Solar World Congress*, Goteborg, Sweden, Jun. 14-19, 2003, seven pages.

Mills, D.R. et al. (2002). "Project Proposal for a Compact Linear Fresnel Reflector Solar Thermal Plant in the Hunter Valley," located at <http://solar1.mech.unsw.edu.au/glm/papers/Mills_projectproposal_newcastle.pdf>, last visited on Jul. 20, 2009, six pages.

Mills, D.R. et al. (Mar. 2004). "Case Study: Low Cost Solar Thermal Power Development in NSW," *Proceedings at Enviro 2004*, Mar. 28, 2004, seven pages.

Mills, D.R. et al. (Feb. 2006). "Multi-tower Line Focus Fresnel Array Project," *Journal of Solar Energy Engineering* 128(1):118-120.

Mills, D. (2004, e-published Apr. 24, 2003). "Advances in Solar Thermal Electricity Technology," *Solar Energy* 76:19-31.

Mills, D. et al. (2004). "Design of a 240 $MW_e$ Solar Thermal Power Plant," located at <http://www.ausra.com/pdfs/Design240MWsolarthermalpowerplant_Mills_2004>, last visited on Jul. 20, 2009, eight pages.

Mills, D.R. et al. (2003). "Solar Preheating of the Liddell Coal-fired Powerplant," *ANZSES Annual Conference 2003*, Nov. 26-29, 2003, pp. 600-604.

Mills, D.R. et al. (2003). "Multi-Tower Line Focus Fresnel Arrays," *Proceedings of ISEC 2003: International Solar Energy Conference*, Manua Kea Resort, Hawaii Island, Hawaii, USA, Mar. 15-18, 2003, six pages.

Mills, D. et al. (Aug. 2002). "The Future of Solar Thermal," *Proceedings of the 8th Renewable & Sustainable Power Conference*, Alice Springs, Australia, Aug. 12-13, 2002, twenty pages.

Pye, J.D. et al. (2003). "Modelling of Cavity Receiver Heat Transfer for the Compact Linear Fresnel Reflector," *ISES World Congress*, Jun. 14-19, 2003, eight pages.

Pye, J.D. et al. (Nov. 2003). Transient Modelling of Cavity Receiver Heat Transfer for the Compact Linear Fresnel Reflector, *ANZSES Solar 2003*, Melbourne, Australia, Nov. 26-29, 2003, nine pages.

Non-Final Office Action mailed on Apr. 24, 2009, for U.S. Appl. No. 10/563,170, filed Dec. 29, 2005, nine pages.

English Translation of the First Office Action for China Application No. 200480018460.1, filed on Jul. 1, 2004, five pages.

English Translation of the Second Office Action for China Application No. 200480018460.1, filed on Jul. 1, 2004, four pages.

English Translation of the Third Office Action for China Application No. 200480018460.1, filed on Jul. 1, 2004, two pages.

English Translation of the First Office Action for China Application No. 200480018459.9, filed on Jul. 1, 2004, five pages.

English Translation of the Second Office Action for China Application No. 200480018459.9, filed on Jul. 1, 2004, four pages.

First Examination Report for Indian Patent Application No. 2608/KOLNP/2005, Jul. 6, 2007, three pages.

International Search Report mailed Aug. 30, 2004, WO 2005/003645 published Jan. 13, 2005.

Written Opinion mailed Aug. 30, 2004, WO 2005/003645 published Jan. 13, 2005.

International Preliminary Report on Patentability mailed Jan. 3, 2006, WO 2005/003645 published Jan. 13, 2005.

International Search Report mailed Aug. 31, 2004, WO 2005/003646 published Jan. 13, 2005.

Written Opinion mailed Aug. 31, 2004, WO 2005/003646 published Jan. 13, 2005.

International Preliminary Report on Patentability mailed Jul. 7, 2005, WO 2005/003646 published Jan. 13, 2005.

International Search Report mailed Aug. 31, 2004, WO 2005/003647 published Jan. 13, 2005.

Written Opinion mailed Aug. 31, 2004, WO 2005/003647 published Jan. 13, 2005.

International Preliminary Report on Patentability mailed May 27, 2005, WO 2005/003647 published Jan. 13, 2005.

Tanner, A.R., "Application of Underground Thermal Energy Storage for Solar Thermal Power Generation in New South Wales", School of Aerospace, Mechanical and Mechatronic Engineering, The University of Sydney (Nov. 2003) pp. ii-xi, 1-112.

Final Office Action mailed Dec. 1, 2009, U.S. Appl. No. 10/563,170, filed Dec. 29, 2005.

Response to Final Office Action mailed May 3, 2010, U.S. Appl. No. 10/563,170, filed Dec. 29, 2005.

International Search Report PCT/AU2004/000884, Sep. 2004.

* cited by examiner

CARRIER FOR A SOLAR ENERGY REFLECTOR ELEMENT

FIELD OF THE INVENTION

This invention relates to a carrier for a reflector element, for use in a solar energy reflector system of a type that is employed for reflecting incident radiation to a solar energy collector system.

BACKGROUND OF THE INVENTION

Various solar energy reflector-collector systems have been developed for use in harnessing solar radiation that falls incident over areas that might range in size from $5 \times 10^1$ $m^2$ to $25 \times 10^6$ $m^2$. In this context reference is made to collector systems that have been disclosed in Australian Patents 694335 and 724486 dated 28 Mar. 1996 and 19 Dec. 1997 respectively.

The most relevant of the earlier known reflector-collector systems, including those disclosed in the referenced patents, employ a field of reflectors which are driven to track movement of the sun (relative to the earth) and which are orientated to reflect incident radiation to distant, elevated collector systems. The individual reflectors are for this purpose mounted to pivotal supports, but little attention has in the past been given to the fabrication of economically attractive such supports or, in the case of relatively large scale reflectors, to the construction of pivotal supports that function to provide torsional stiffness at a level to resist deflection of the supports and supported reflector elements.

SUMMARY OF THE INVENTION

The present invention seeks to minimise the above inadequacies by providing a carrier structure for a reflector element, for use in a solar energy reflector system, and which comprises a platform which is arranged to carry the reflector element and which is formed with stiffening elements, a frame structure supporting the platform, and mounting means supporting the frame structure in a manner that accommodates turning of the carrier structure about an axis of rotation that lies substantially coincident with a longitudinal axis of the reflector element when mounted to the platform.

OPTIONAL FEATURES OF THE INVENTION

The carrier structure may, in one embodiment of the invention, be carried by the mounting means in a manner which accommodates unidirectional rotation of the carrier structure about the axis of rotation that is substantially coincident with the longitudinal axis of the reflector element. By "substantially coincident" is meant that the axis of rotation is located coincident with or adjacent to the longitudinal axis of the reflector element.

A drive system incorporating an electric motor may, in accordance with one embodiment of the invention, be provided for imparting unidirectional turning drive to the carrier structure. By providing such a system, in which unidirectional drive is imparted to the carrier structure, the traditional requirement for a reversible motor or a pivoting mechanism, with attendant backlash and other problems, is avoided. Also, by employing such a drive system, the carrier structure may be parked in a selected angular position with the reflector element orientated downwardly, to shield it from adverse ambient conditions, during the process of turning (ie, rotating) the carrier structure through 360 degrees during each 24-hour period. Furthermore, the carrier structure may at any time within each 24-hour period be rotated temporarily to a selected angular position with the reflector element orientated in a direction away from potentially damaging climatic conditions.

The platform for the reflector element may, in one embodiment of the invention, comprise a fluted or corrugated metal panel, with the flutes or corrugations forming the stiffening elements of the platform. In such case, the reflector element will be supported upon the crests of the flutes or corrugations. Furthermore, although the flutes or corrugations may extend in a direction that intersects the longitudinal axis of the reflector element, the flutes or corrugations desirably are orientated to extend in a direction parallel to the longitudinal axis of the reflector element.

Also, although the platform may be formed with a flat surface or such that the crests of the flutes or corrugations are located in a flat plane, the platform desirably is curved concavely in a direction orthogonal to the longitudinal axis of the reflector element.

The frame structure of the carrier structure may comprise a skeletal frame structure having hoop-like end members that extend about the axis of rotation of the carrier structure and between which the platform extends. In this optional embodiment of the invention, the end members will be supported for turning upon the above mentioned mounting means for the carrier structure.

The mounting means for supporting the carrier structure or, in the optional embodiment of the invention, for each of the hoop-like end members, may comprise spaced-apart supporting rollers. Such rollers desirably are sized and otherwise arranged to track within a channel region of the associated end member.

The drive system for imparting unidirectional drive to the carrier structure may, in accordance with one embodiment of the invention, be coupled to at least one of the hoop-like end members and it desirably incorporates a link chain that extends around and is fixed to one of the end members to form, in effect, a gear wheel. In the latter case a sprocket will be provided to engage with the link chain and to impart drive to the end member from the electric motor. With such a drive arrangement, a relatively inexpensive electric motor may be employed and, with appropriately sized end members of the carrier structure, a high reduction in drive velocity and a commensurate increase in torque transmission is obtained.

The reflector element may comprise a single panel-shaped glass mirror or a reflective metal panel, but it desirably comprises a plurality of square or rectangular glass mirrors that are mounted in edge abutting relationship upon the supporting platform. In this case the rear, silvered faces of the mirrors may be protected against adverse ambient conditions by sealing surrounding gaps and spaces with a silicone or other suitable sealant. When, as mentioned above, the platform for the reflector element is curved concavely, the reflector element will be secured to the platform in a manner such that the concavity will be transferred to the reflecting surface of the reflector element.

The carrier structure of the invention may be embodied in various arrangements, one of which is now described, by way of example, with reference to the accompanying drawings. The carrier structure is described in the context of a complete reflector system.

DETAILED DESCRIPTION OF AN EMBODIMENT OF THE INVENTION

Figure 1:
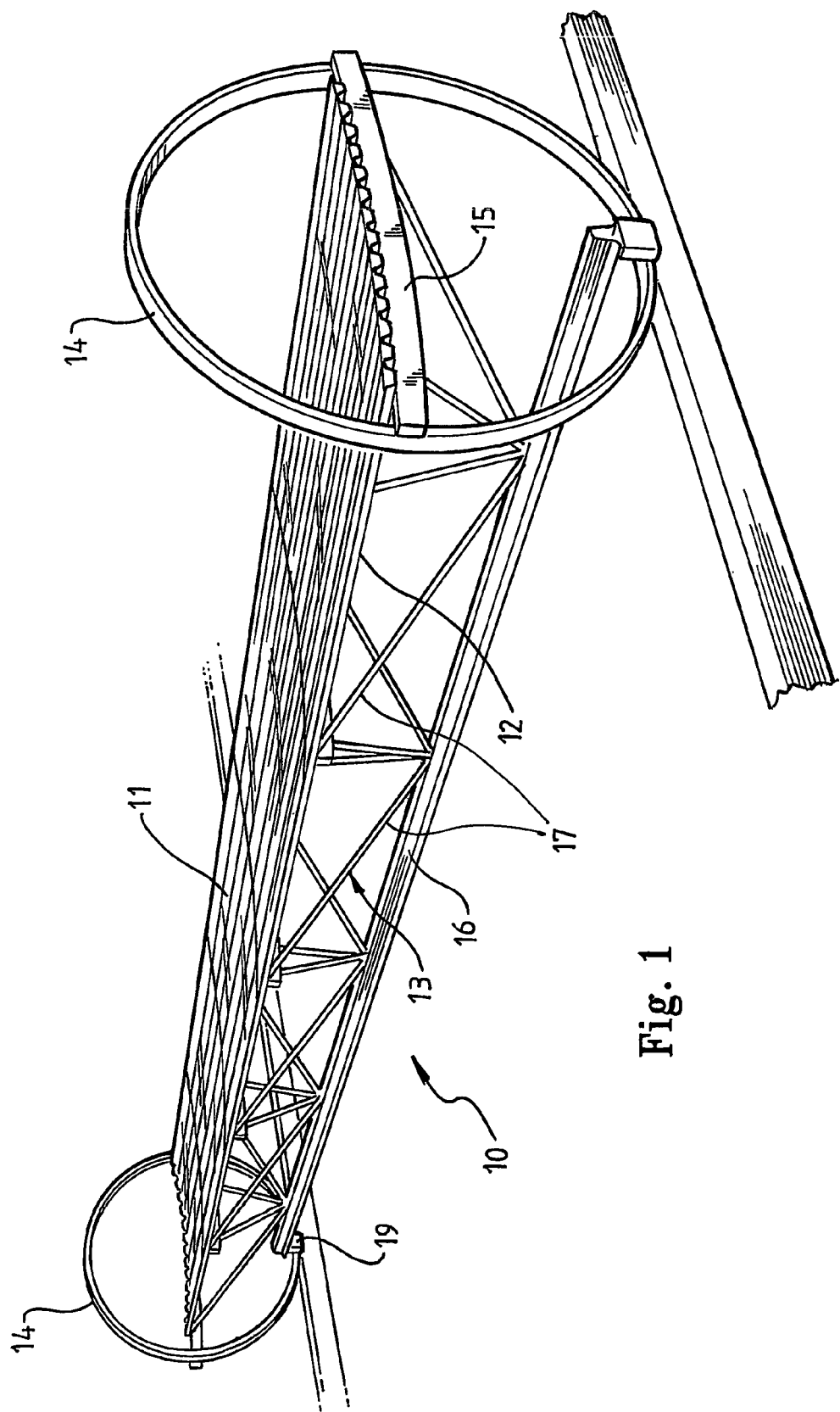
FIG. 1 shows a perspective view of the reflector system with a carrier structure of the system rotated to an angular position in which a reflector element is orientated to reflect in an upward direction.
Figure 2:
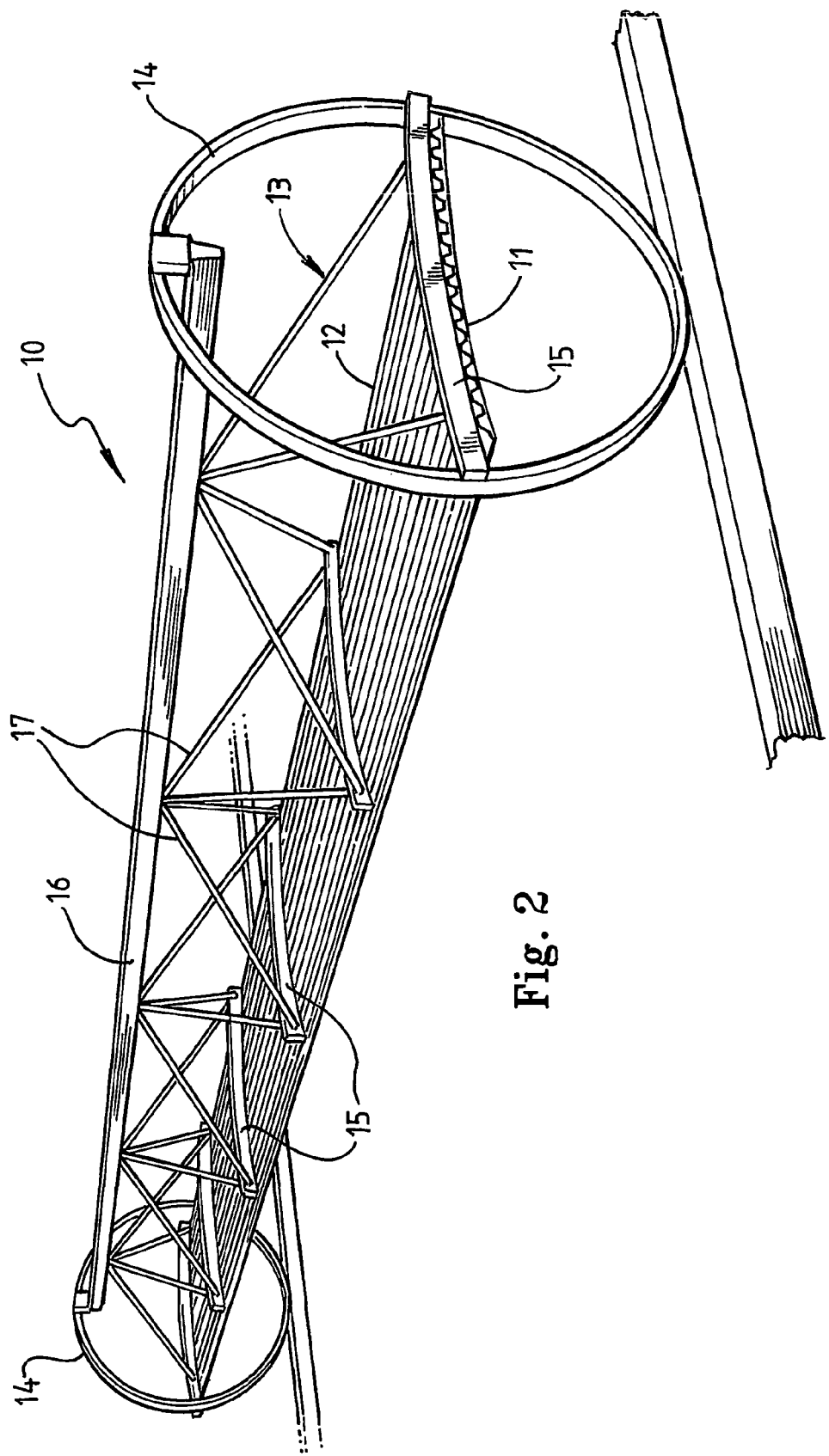
FIG. 2 shows a perspective view of the same reflector system but with the carrier structure rotated through approximately 180 degrees to expose the underside of a platform and skeletal frame structure for the reflector element.

As illustrated, the reflector system in its exemplified embodiment comprises a carrier structure 10 to which a reflector element 11 is mounted. The carrier structure itself comprises an elongated panel-like platform 12 which is supported by a skeletal frame structure 13. The frame structure includes two hoop-like end members 14.

The members 14 are centred on and extend about an axis of rotation that is approximately coincident with a central, longitudinally-extending axis of the reflector element 11. The axis of rotation does not need to be exactly coincident with the longitudinal axis of the reflector element but the two axes desirably are at least adjacent on another.

In terms of overall dimensions of the reflector system, the platform 12 is approximately twelve meters long and the end members 14 are approximately two meters in diameter.

The platform 12 comprises a corrugated metal panel and the reflector element 11 is supported upon the crests of the corrugations. The corrugations extend parallel to the direction of the longitudinal axis of the reflector element 11, and the platform 12 is carried by six transverse frame members 15 of the skeletal frame structure 13. End ones of the transverse frame members 15 effectively comprise diametral members of the hoop-like end members 14.

The transverse frame members 15 comprise rectangular hollow section steel members and each of them is formed with a curve so that, when the platform 12 is secured to the frame members 15, the platform is caused to curve concavely (as viewed from above in FIG. 1) in a direction orthogonal to the longitudinal axis of the reflector element 11. The same curvature is imparted to the reflector element 11 when it is secured to the platform 12.

The radius of curvature of the transverse frame members 15 is in the range of twenty to fifty meters and preferably of the order of thirty-eight meters.

The skeletal frame 13 of the carrier structure 10 also comprises a rectangular hollow section steel spine member 16 which interconnects the end members 14, and a space frame which is fabricated from tubular steel struts 17 connects opposite end regions of each of the transverse frame members 15 to the spine member 16. This skeletal frame arrangement, together with the corrugated structure of the platform 12 provides the composite carrier structure 11 with a high degree of torsional stiffness.

Figure 4:
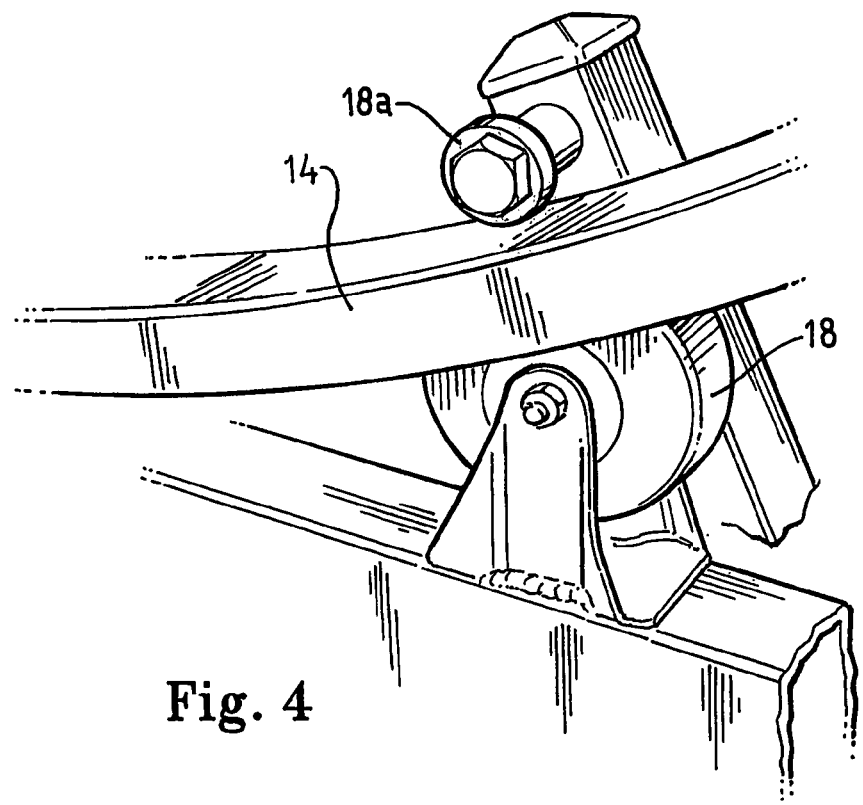
FIG. 4 shows, also on an enlarged scale, a portion of the end member and an associated mounting arrangement for the reflector system.

The hoop-like end members 14 are formed from channel section steel, such that each end member is provided with a U-shaped circumferential portion and, as shown in FIG. 4, each of the members 14 is supported for rotation on a mounting arrangement that comprises two spaced-apart rollers 18. The rollers 18 are positioned to track within the channel section of the respective end members 14, and the rollers 18 provide for turning (ie, rotation) of the carrier structure 10 about the axis of rotation that is approximately coincident with the longitudinal axis of the reflector element 11.

As also shown in FIG. 4, a hold-down roller 18a is located adjacent the support rollers 18 and is positioned within the associated end member 14 to prevent lifting of the reflector system under adverse weather conditions.

Figure 3:
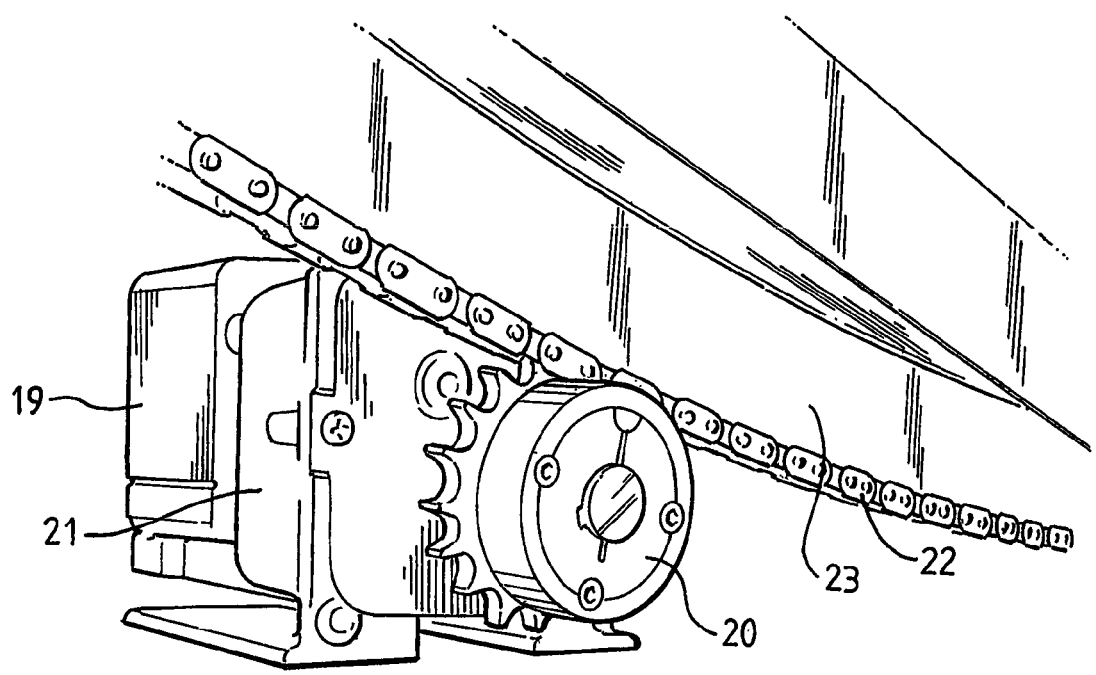
FIG. 3 shows, on an enlarged scale, a portion of an end member and a drive system of the reflector system.

A drive system, as shown in see FIG. 3, is provided for imparting unidirectional drive to the carrier structure 10 and, hence, to the reflector element 11. The drive system comprises a shaded pole or other similar such non-reversible electric motor 19 having an output shaft coupled to a sprocket 20 by way of reduction gearing 21. The sprocket 20 meshes with a link chain 22 through which drive is directed to the carrier structure 10.

The link chain 22 extends around and is fixed to the periphery of the outer wall 23 of the channel-section of one of the end members 14. That is, the link chain 22 affixed to the end member effectively forms a type of gear wheel with which the sprocket 20 engages.

With the end member 14 having a diameter in the order of 2.00 m and the sprocket 20 having a pitch circle diameter of 0.05 m, reduction gearing and torque amplification in the order of (40.r):1 may be obtained, where r is the reduction obtained through gearing at the output of the electric motor 19.

The reflector element 11 is formed by butting together five glass mirrors, each of which has the dimensions 1.8 m×2.4 m. A silicone sealant is employed to seal gaps around and between the mirrors and to minimise the possibility for atmospheric damage to the rear silvered faces of the mirrors, and the mirrors are secured to the crests of the platform 12 by a urethane adhesive.

The mirrors have a thickness of 0.003 m and, thus, they may readily be curved in situ to match the curvature of the supporting platform 12.

Depending upon requirements, two or more of the above described reflector systems may be positioned linearly in a row and be connected one to another by way of adjacent ones of the hoop-like end members 14. In such an arrangement a single drive system may be employed for imparting unidirectional drive to the complete row of reflector systems.

Variations and modifications may be made in respect of the carrier structure as above described by way of example without departing from the scope of the appended claims.

The invention claimed is:

1. A carrier structure for a reflector element, for use in a solar energy reflector system, and which comprises:
   a reflector element;
   a platform which is separate from the reflector element and upon which the reflector element is mounted, and which is formed with stiffening elements;
   a frame structure supporting the platform, wherein the frame structure comprises a space frame;
   at least one curved transverse frame member; and
   a mounting arrangement supporting the frame structure in a manner that accommodates turning of the carrier structure about an axis of rotation that lies substantially coincident with a longitudinal axis of the reflector element when mounted to the platform,
   wherein the space frame comprises struts connecting opposite end regions of the at least one curved transverse frame member to a spine member;

wherein the platform is secured to the at least one curved transverse frame member in a manner such that the curvature of the at least one curved transverse frame member causes the platform to curve concavely, and wherein the reflector element is secured to the platform in a manner such that the curvature of the platform causes the reflector element to curve concavely.

2. The carrier structure as claimed in claim 1 wherein the platform comprises a corrugated metal panel, with the corrugations forming the stiffening elements, and wherein the reflector element is supported upon the crests of the corrugations.

3. The carrier structure as claimed in claim 2 wherein the stiffening elements are orientated to extend in a direction parallel to the axis of rotation.

4. The carrier structure as claimed in claim 1 wherein the platform comprises a panel-like platform, wherein the stiffening elements are formed as flutes in the platform and wherein the reflector element is supported upon crests of the flutes.

5. The carrier structure as claimed in claim 1 wherein the platform is curved concavely in a direction orthogonal to the axis of rotation.

6. The carrier structure as claimed in claim 5 wherein the platform is curved with a radius of curvature within the range of 20 to 50 meters.

7. The carrier structure as claimed in claim 1 wherein the reflector element comprises a panel-shaped glass mirror.

8. The carrier structure as claimed in claim 1 wherein the reflector element comprises a plurality of edge-abutting glass mirrors.

9. The carrier structure as claimed in claim 1 wherein the reflector element is adhered to the platform.

10. The carrier structure as claimed in claim 1 wherein the frame structure comprises hoop-like end members that extend about the axis of rotation of the carrier structure and wherein the platform extends in the longitudinal direction between the end members.

11. The carrier structure as claimed in claim 10 wherein the end members are supported for turning upon the mounting arrangement.

12. The carrier structure as claimed in claim 10 wherein each said hoop-like end member has a channel-section circumferential portion and a diametrically extending member that is constituted by one of the curved transverse frame members.

13. The carrier structure as claimed in claim 12 wherein the mounting arrangement comprises spaced-apart supporting rollers which track within the circumferential portion of associated ones of the end members.

14. The carrier structure as claimed in claim 13 wherein the drive system comprises:
a) a link chain that extends around and is fixed to the end member to form a gear wheel;
b) an electric motor; and
c) a sprocket for transferring drive from the motor to the link chain.

15. The carrier structure as claimed in claim 10 and further comprising a drive system for imparting unidirectional turning drive to the carrier structure by way of at least one of the end members.

16. The carrier structure as claimed in claim 10, wherein each of the hoop-like end members has a diametrically extending member that is constituted by one of the curved transverse frame members, and wherein the space frame connects opposite end regions of each of the curved transverse frame members to a spine member.

17. The carrier structure as claimed in claim 16, wherein the spine member interconnects the end members.

18. The carrier structure as claimed in claim 10, wherein the mounting arrangement further comprises a hold-down roller which prevents the lifting of the end members.

19. The carrier structure as claimed in claim 10, wherein two or more carrier structures are positioned linearly in a row and are connected to one to another by way of adjacent ones of the hoop-like end members.

20. The carrier structure as claimed in claim 19 and further comprising a drive system for imparting unidirectional turning drive to the row of two of more carrier structures by way of at least one of the end members.

21. A carrier structure for a reflector element, for use in a solar energy reflector system, and which comprises:
a platform which is separate from and is arranged to carry the reflector element and which is formed with stiffening elements,
a frame structure supporting the platform, wherein the frame structure comprises a space frame, and wherein the frame structure comprises hoop-like end members that extend about the axis of rotation of the carrier structure and wherein the platform extends in the longitudinal direction between the end members, wherein each of the hoop-like end members has a channel-section circumferential portion, wherein the carrier structure comprises at least one curved transverse frame member, wherein the space frame comprises struts connecting opposite end regions of the at least one curved transverse frame member to a spine member, wherein the platform is secured to the at least one curved transverse frame member in a manner such that the curvature of the at least one curved transverse frame member causes the platform to curve concavely, and wherein the reflector element is secured to the platform in a manner such that the curvature of the platform causes the reflector element to curve concavely; and
a mounting arrangement supporting the frame structure in a manner that accommodates turning of the carrier structure about an axis of rotation that lies substantially coincident with a longitudinal axis of the reflector element when mounted to the platform, wherein the end members are supported for turning upon the mounting arrangement, and wherein the mounting arrangement comprises spaced-apart supporting rollers which track within the circumferential portion of associated ones of the end members.

* * * * *